(12) United States Patent
White

(10) Patent No.: US 8,543,347 B2
(45) Date of Patent: Sep. 24, 2013

(54) SELF-CORRECTING ELECTRONIC SENSOR

(75) Inventor: Bert White, Irvine, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 607 days.

(21) Appl. No.: 12/826,272

(22) Filed: Jun. 29, 2010

(65) Prior Publication Data

US 2011/0320157 A1    Dec. 29, 2011

(51) Int. Cl.
*G01K 15/00* (2006.01)

(52) U.S. Cl.
USPC .......................................................... 702/99

(58) Field of Classification Search
USPC ............................................................ 702/99
See application file for complete search history.

(56) References Cited

U.S. PATENT DOCUMENTS 7,092,840 B2 * 8/2006 Gualtieri ........................ 702/150
2008/0024119 A1 * 1/2008 Gualtieri .................. 324/207.15

* cited by examiner

*Primary Examiner* — Aditya Bhat

(57) ABSTRACT

A temperature sensing circuit is described providing a low power temperature sensing system. The temperature sensing circuit provides a digital method for determining the temperature by analyzing the change in electrical response characteristics of a circuit device.

37 Claims, 13 Drawing Sheets

SELF-CORRECTING ELECTRONIC SENSOR

FIELD OF THE INVENTION

The present disclosure relates to the field of electronic sensors.

BACKGROUND

Electronic sensors are used in various applications to monitor physical parameters that affect the performance of devices or systems, or to collect information about the performance of devices or systems. Sensor measurements are often used to determine whether or not the operation of components or sub-systems of a particular device or system can be adjusted to improve or correct performance.

Sensors for measuring temperature are particularly useful in devices and systems with electrical and electronic components. Temperature can often affect the performance of electrical and electronic components. For example, temperature can affect the frequency of an oscillator or the amount of current drawn from a battery. Temperature measurements are useful for determining if temperature is having an affect on electrical and electronic components. In some instances, temperature measurements can be used to adjust the performance of electrical and electronic components in order to maintain desired operating characteristics.

However, previously available electronic temperature sensors are complex and require a relatively high amount of electrical energy to power their operation. For example, a common way to measure temperature electronically requires a precise analog voltage reference and an analog-to-digital (A/D) based circuit including of several precise amplifiers or comparators. Such an A/D-based sensor requires a relatively high amount of analog circuitry that dissipates a relatively significant amount of electrical power. Moreover, precisely designed analog circuits are often sensitive to manufacturing variations.

SUMMARY OF THE INVENTION

The present disclosure provides an electronic sensor that uses relatively few analog components. Circuits with fewer analog components use less power and dissipate less heat.

The present disclosure is thus useful in avoiding the various drawbacks of prior art sensors. For example, how an electronic sensor operates or interacts with its surroundings can adversely affect a physical parameter the sensor is being used to monitor. Thus, a temperature sensor that dissipates a lot of heat can adversely affect the circuit as a whole.

Previously available electronic sensors used to monitor physical parameters or properties with continuous time varying values are often complex. For example, previously available A/D-based sensors have a high analog component count and dissipate a relatively significant amount of power that contributes to raising the operating temperature of the sensor and its surroundings. The required analog components of previously available sensors had to be precisely configured, making them sensitive to manufacturing variations.

Moreover, previously available electronic sensors of all types, including electronic temperature sensors, required the use of a feedback configuration to compensate for temperature effects. Until a feedback loop reaches a steady state and the temperature measurements converge on a stable value, the temperature measurements provided by such an electronic temperature sensor are often inaccurate.

The present disclosure describes some examples of an electronic sensor that substantially sense and compensate for temperature effects on components of the electronic sensor. The electronic sensor may provide a temperature-compensated output. In an example, the electronic sensor provides an indication of operating temperature. In an example, the electronic sensor corrects a sensor output for sensed temperature indication. In an example, the electronic sensor does not utilize the calculated temperature measurement to correct for temperature effects on components of the electronic sensor in operation.

In an example, other measurements of physical parameters can be obtained using the same basic measurement configuration, while the electronic sensor compensates for temperature effects in operation. Other physical parameters that can be measured include, without limitation, temperature, voltage, current, frequency, humidity, pressure, altitude, and magnetic fields. Some examples of the electronic sensor described herein can be specifically configured to provide a variety of physical parameters individually or in combination.

Some examples of the electronic sensor described herein can either be fully or partially integrated onto a single semiconductor chip. Some examples will be relatively less complex, have a relatively low component count, and dissipate relatively less power. Some examples, will occupy relatively less die area, will be relatively less difficult to test in production, will be relatively more portable to new digital circuit manufacturing processes, and will be less sensitive to batch variations of semiconductor manufacturing processes.

DETAILED DESCRIPTION

The present disclosure describes an electronic sensor that substantially senses and compensates for temperature effects on components of the electronic sensor. For example, the electronic sensor provides a temperature-compensated output. For example, the electronic sensor provides an indication of operating temperature. For example, the electronic sensor corrects a sensor output for sensed temperature indication. For example, the electronic sensor does not utilize the calculated temperature measurement to correct for temperature effects on components of the electronic sensor in operation. Other measurements of physical parameters can be obtained using the same basic measurement configuration, while the electronic sensor compensates for temperature effects in operation. Other physical parameters that can be measured include, without limitation, temperature, voltage, current, frequency, humidity, pressure, altitude, and magnetic fields.

Some electronic sensors described herein can be specifically configured to output an indication of a variety of physical parameters individually or in combination, while self-correcting for temperature effects in operation.

Some electronic sensors described herein can either be fully or partially integrated onto a single semiconductor chip.

Figure 1:
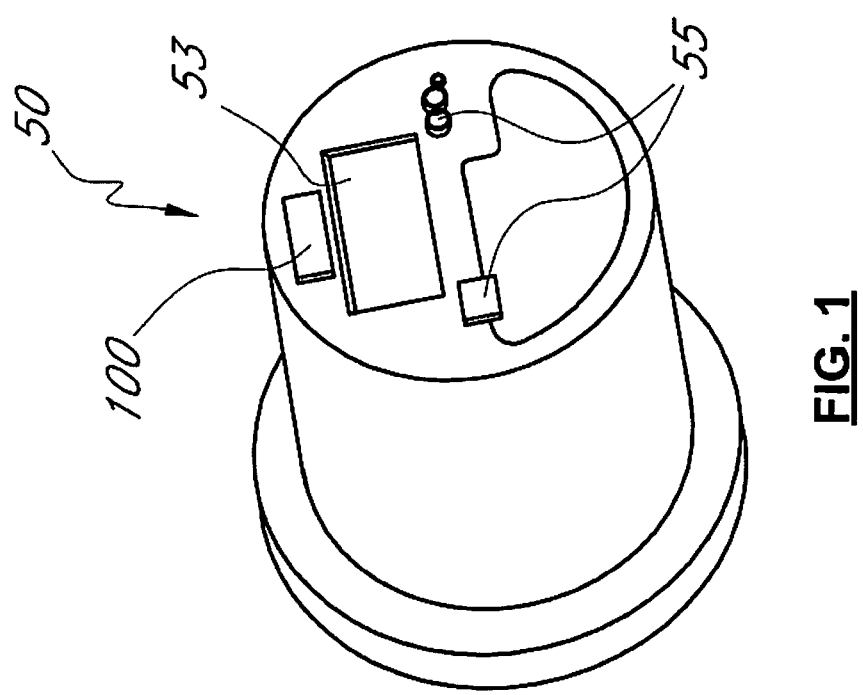
FIG. 1 is an illustration of a power meter with a display.

FIG. 1 illustrates a power meter 50 with display 51 and controls 55, such as, for example, buttons, knobs, inputs, outputs, or the like. In operation, the operating temperature of the power meter 50 can fluctuate. Fluctuations in the temperature can affect the performance of the power meter 50.

An electronic sensor 100 is included with the power meter 50. In one example, the power meter 50 is in communication with the electronic sensor 100. In operation, the electronic sensor 100 provides temperature-compensated measurements to the power meter 50. The operation of the power meter 50 can be adjusted in response to the information provided by the temperature-compensated measurements.

Figure 2:
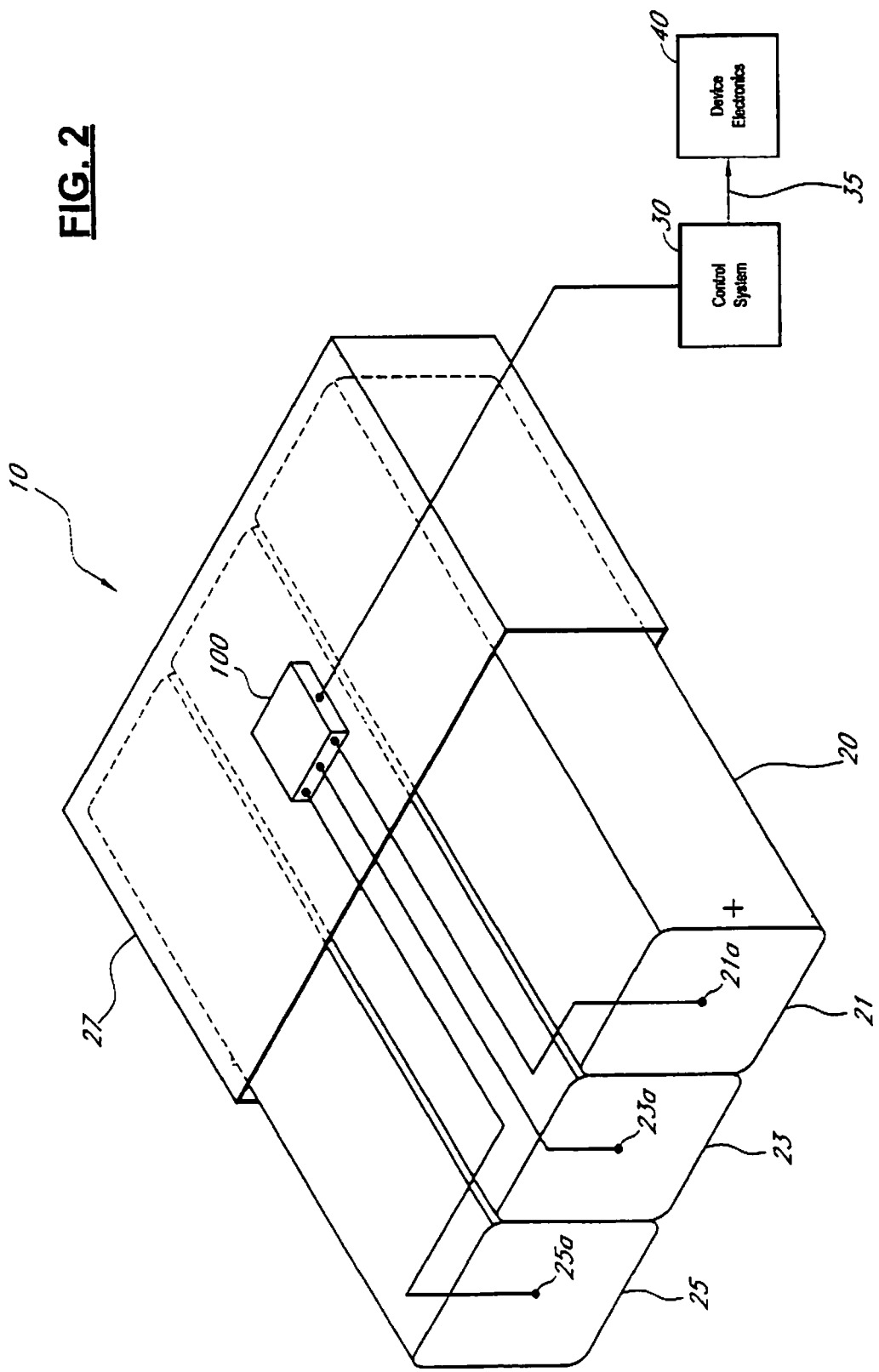
FIG. 2 is an illustration of an electronic sensor system.

FIG. 2 is an illustration of an electronic sensor system 10. The system 10 includes an electronic sensor 100, and as an illustrative example only, a battery pack 20, a control system 30 and device electronics 40. The system 10 is a simplified illustration of the type of system that may be found in a number of different applications, such as for example, but not limited to, cell phones, hybrid cars, electric cars, portable and fixed appliances, and mobile and fixed computers.

The battery pack 20 includes three batteries 21, 23, 25 and a housing 27. Each battery 21, 23, 25 has a corresponding electrical connection 21a, 23a, 25a, respectively. The batteries 21, 23, 25 are encased in a housing 27. The electronic sensor 100 is affixed or merely placed in close proximity to the housing 27. The electronic sensor 100 is optionally connected to the electrical connections 21a, 23a, 25a. The electronic sensor 100 is also connectable to the controller system 30. The controller system 30 is also connectable to the device electronics 40 through a control connection 35.

In operation, the batteries 21, 23, 25 can rise in temperature, in turn causing the outside of the housing 27 to rise in temperature. The increase in temperature may affect the control system 30 and device electronics 40 if the control system 30 and device electronics 40 are in close enough proximity to the housing 27 to be affected. The sensor 100 senses the temperature, without necessarily directly measuring it, and provides temperature-corrected sensed values relating to temperature, battery voltage or current to the control system 30 that are corrected with respect to the temperature on the outside wall of the housing 27. The specific examples below describe in greater detail the operation of examples of the electronic sensor 100.

Figure 3:
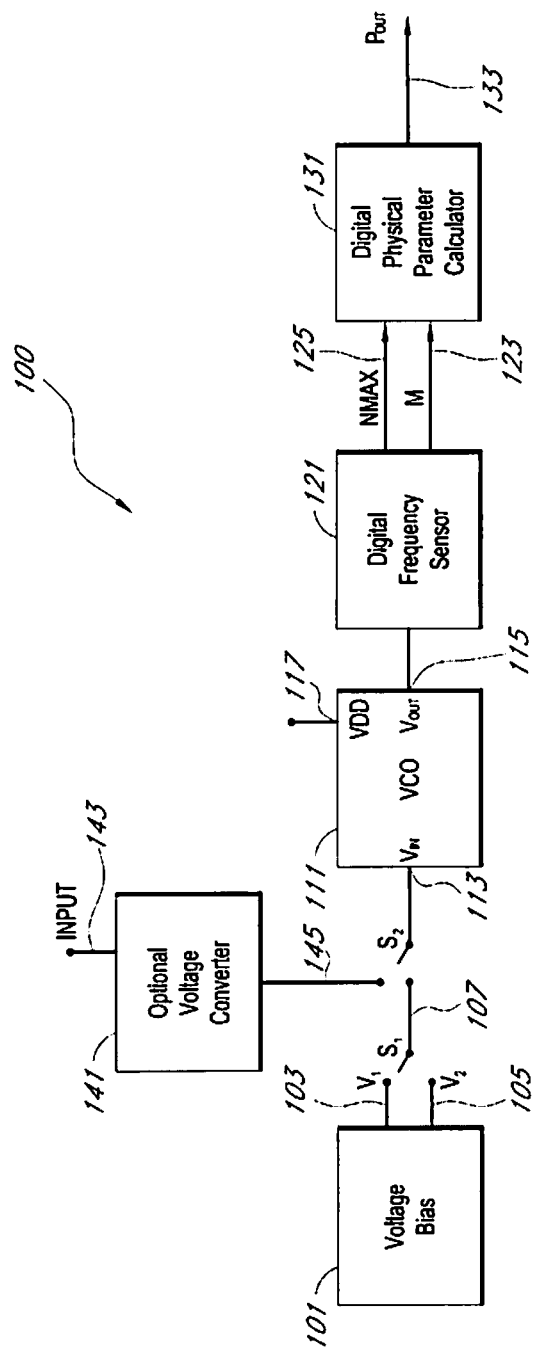
FIG. 3 is a block diagram of an electronic sensor.

FIG. 3 is a block diagram of an example of an electronic sensor 100 configurable to measure a physical parameter, such as, for example temperature or voltage. The electronic sensor includes a voltage bias circuit 101, a voltage controlled oscillator (VCO) 111, a digital frequency sensor 121, and a digital physical parameter calculator 131. The electronic sensor 100 of FIG. 3 also optionally includes an optional voltage converter 141.

The voltage bias circuit 100 provides at least two precise voltage reference levels $V_1$ and $V_2$ that are used to create intermediary values using the VCO 111 relating to a final temperature-compensated measurement of a physical parameter. The voltage bias circuit 101 includes first and second electrical output connections 103 and 105, hereinafter referred to as first and second connections 103 and 105. The voltage bias circuit 101 is connectable to the VCO 111 through a first switch $S_1$ and an optional second switch $S_2$. The first switch $S_1$ is selectively connectable between the first and second connections 103 and 105, and is further connectable to electrical node 107.

In operation, the voltage bias circuit 101 provides first and second output voltages $V_1$ and $V_2$ on the respective first and second connections 103 and 105. The first switch $S_1$ is used to set the voltage on the electrical node 107 to one of the first and second output voltages $V_1$ and $V_2$ from the voltage bias circuit 101. Examples of how the first and second output voltages $V_1$ and $V_2$ can be produced within the voltage bias circuit 101 are described in greater detail below with reference to FIGS. 4A, 4B and 4C.

The optional voltage converter 141 includes an input connection 143 and an electrical output connection 145, hereinafter referred to as connections 143 and 144. In operation, the optional voltage converter 141 receives an input signal on connection 143, and provides an output voltage derived from the input signal on the connection 145. The input signal received on connection 143 can be any value indicative of a measurement of a physical parameter, including, without limitation, temperature, voltage, current, frequency, humidity, pressure, altitude, and magnetic fields. Options for using the optional voltage converter 141 are described in greater detail below with reference to FIGS. 7A, and 8.

The VCO 111 is used to create at least two output frequencies that are indicative of the temperature effects on the components of the electronic sensor 100. The VCO 111 includes first and second electrical input connections 117 and 113, and an electrical output connection 115. The connection 117 is connectable to a top rail voltage supply connection $V_{DD}$ of the VCO 111, which is used to set the operating range of the VCO 111. In some examples, the voltage supplied to the top rail voltage supply connection $V_{DD}$ can be used as a control to change the overall operation of the electronic sensor 100. The connection 113 is connectable to the voltage input control connection $V_{IN}$, which is used to control the operating frequency of the VCO 111. In some examples, both voltages supplied to the top rail voltage supply connection $V_{DD}$ and the voltage input control connection $V_{IN}$ can be used to control the operating frequency of the VCO 111. A more detailed description of a specific example of the VCO 111 is described below with reference to FIG. 5.

The connection 113 is connectable to the switch $S_2$. The second switch $S_2$ is selectively connectable between the electrical node 107 and the connection 145 of the optional voltage converter 141. Again, the electrical node 107 is ultimately connectable to the voltage bias circuit 101 through switch $S_1$.

In operation, the output frequency of the VCO 111 is set by selectively connecting one of the connections 103, 105 (of the voltage bias circuit 101) and the connection 145 of the optional voltage converter 141 to the connection 113 of the VCO 111 through operation of the first and second switches $S_1$ and $S_2$. The application of one of the corresponding voltages available on the connections 103, 105 and 145 to the input of the VCO 111 causes the VCO 111 to change the fundamental frequency of the output voltage signal, which is available on the output electrical connection 115.

The electrical output connection 115 of the VCO 111 is connectable to the digital frequency sensor 121. The digital frequency sensor 121 can be embodied in a number of different forms. In some examples, frequency is measured using a digital counter, such that the measured frequency is the value of the digital counter divided by the duration of time over which the count was taken. In some examples, an up/down digital counter is used because it permits both an upward count and a downward count. In some examples, a phase lock loop is used. In some examples a digital phase lock loop is used to measure the VCO frequency. In some examples, a time-to-digital converter is used. A time-to-digital converter takes the output of the VCO 111 as an input, and in turn outputs a digital value that represents the frequency.

In FIG. 3 the digital frequency sensor 121 is illustrated as providing two output connections, 123 and 125. Each of the two output connections 123 and 125 can be either a single electrical node or a plurality of nodes forming a parallel digital bus or a plurality of digital registers accessible by other components. Alternatively, the two output connections 123 and 125 can be combined into a single electrical node or a single bus, over which separate digital signals are provided in series or in a time-division multiplexed manner. Those skilled in the art will also appreciate from the present disclosure that three or more output connections, adapted in any of the ways previously disclosed can be provided by the digital frequency sensor in some examples.

In operation the digital frequency sensor 121 provides at least two digital values, such as NMAX and M, derived from the respective output voltages $V_2$ and $V_1$, which are produced by the voltage bias circuit 101. More specifically, in some examples, the digital values NMAX and M are indicative of portions of the corresponding frequency response of the VCO 111 created by applying voltages $V_2$ and $V_1$ to the electrical input connection 113 of the VCO. The digital values NMAX and M are described in greater detail below with reference to the specific examples corresponding to FIGS. 6A and 7A.

The digital physical parameter calculator 131 includes digital logic circuits arranged to perform specific digital calculations and an output connection 133. The output connection 133 can be either a single electrical node or a plurality of nodes forming a parallel digital bus or a plurality of digital registers accessible by other components.

In operation, the digital physical parameter calculator 131 receives at least the digital values NMAX and M from the digital frequency sensor 121, and subsequently derives a digital value $P_{out}$ indicative of the continuous time varying physical parameter the electronic sensor 100 is configured to measure. How the digital physical parameter calculator 131 derives the digital value $P_{out}$ using the digital values NMAX and M is dependent on the nature of the physical parameter in relation to digital values NMAX and M and whether or not another digital value related to the physical parameter is used. In some examples, when another digital value related to the physical parameter is used the optional voltage converter 141 is usefully configured and employed in combination with the VCO 111 to derive that digital value.

In some examples, the derivation of a digital value indicative of a measurement of a physical parameter can be made more accurate by increasing the relative accuracy of the digital values NMAX and M. In many examples, NMAX and M are respectively derived from the output voltages $V_2$ and $V_1$ produced by the voltage bias circuit 101, which serve as reference voltages.

In the prior art, precision of a voltage reference was dependent on the precision of the analog circuitry needed to create the reference. In particular, producing a precise voltage reference required a precise current source that can be adjusted to change the level of the voltage reference. The precision of the voltage reference and the supporting current source are degraded by manufacturing variations. This can be especially problematic for integrated circuits, which are susceptible to batch variations common in semiconductor manufacturing.

Figure 4C:
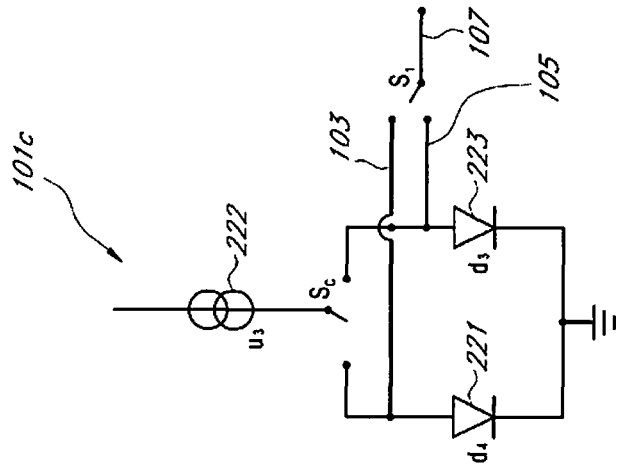
FIG. 4C is a schematic illustration of another voltage bias circuit.
Figure 4B:
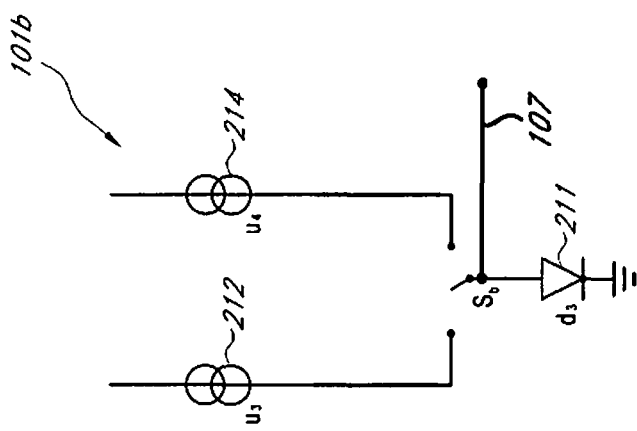
FIG. 4B is a schematic illustration of another voltage bias circuit.
Figure 4A:
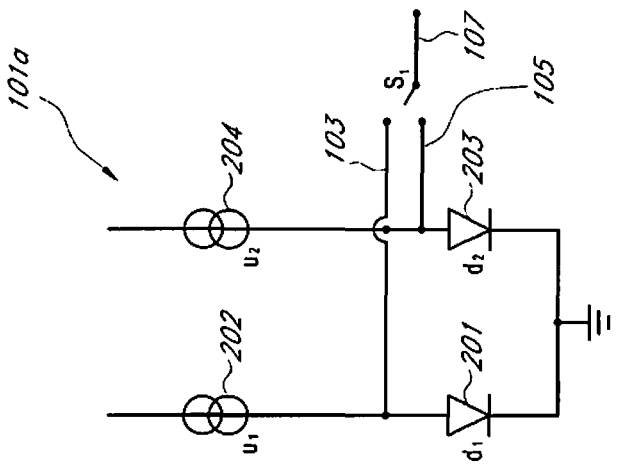
FIG. 4A is a schematic illustration of a voltage bias circuit.

Alternatively, precision of the voltage bias circuit 101 can be achieved by instead setting a relatively precise ratio between the physical dimensions of two or more components. A ratio between the physical dimensions of two or more components is less susceptible to batch variations and manufacturing irregularities. The precision of the ratio is often further ensured when the components are in close proximity to one another on the same die, because dimensions are both accurately and precisely set. Moreover, there is a low likelihood of manufacturing irregularities affecting the accuracy and precision of the physical dimensions of components that are close together on the same chip. Thus, even if there are batch variations a ratio based on the physical dimensions of two or more components is unlikely to vary significantly from one batch to the next. Accordingly, precision of the ratio between components and features can advantageously be relied upon to create precise voltage references. FIGS. 4A, 4B and 4C are schematic illustrations of three respective examples of how the first and second output voltages $V_1$ and $V_2$ can be produced within the voltage bias circuit 101 by relying on a precise ratio between the physical dimensions of two or more components.

In some examples, the first and second output voltages $V_1$ and $V_2$ can be produced by manufacturing, testing and matching components with similar performances.

Those skilled in the art will appreciate from the present disclosure, and with reference to FIGS. 4A, 4B and 4C in particular, that the voltage bias circuit can provide three or more separate output voltages. In some examples, the voltages produced will rely on a precise ratio relating the physical dimensions of three or more components (e.g. diodes, resister or current sources, etc.).

Turning to FIG. 4A, with continued reference to FIG. 3, shown is a schematic illustration of a first example of the voltage bias circuit 101a shown with the first switch $S_1$ included in FIG. 3. The voltage bias circuit 101a includes two parallel branches. The first branch includes a first current source 202 connected in series with the anode of a first diode 201, and the cathode of the first diode 201 is in turn connected to ground. The second branch includes a second current source 204 connected in series with the anode of a second diode 203, and the cathode of the second diode 203 is in turn also connected to ground.

The first electrical output connection 103 is connectable to the anode of the first diode 201. As such, in operation the output voltage $V_1$ is substantially equal to the voltage at the anode of the first diode 201. Similarly, the second electrical output connection 105 is connectable to the anode of the second diode 203. As such, in operation the output voltage $V_2$ is substantially equal to the voltage at the anode of the second diode 203.

The first and second diodes 201 and 203 have respective sizes $d_1$ and $d_2$. The sizes $d_1$ and $d_2$ of the respective first and second diodes 201 and 203 are set according to a first ratio $r_d$. That is, $r_d$ is the ratio between $d_1$ and $d_2$.

The first and second current sources 202 and 203 are designed to output currents $u_1$ and $u_2$. The respective magnitudes of the currents $u_1$ and $u_2$ produced by the corresponding current sources 202 and 204 are set according to a second ratio $r_u$. That is, $r_u$ is the ratio between $u_1$ and $u_2$.

The relevant ratio in this example is the ratio between the resulting current densities from each of the two branches is denoted as $r_j$, which can be calculated according to equation (1).

$$r_j = \frac{r_d}{r_u} = \frac{d_1 u_2}{d_2 u_1} \quad (1)$$

Turning to FIG. 4B, with continued reference to FIG. 3, shown is a schematic illustration of a second example of the voltage bias circuit 101b shown with the first switch $S_1$ included in FIG. 3. The voltage bias circuit 101b includes a diode 211, two current sources 212 and 214, and a switch $S_b$. The switch $S_b$ is connected to the anode of the diode 211, and the cathode 215 of the diode 211 in turn is connected to ground. The switch $S_b$ is also selectively connectable between the first and second electrical output connections 103 and 105. The electrical output connections 103 and 105 also correspond to the output connections of the first and second current sources 212 and 214, respectively. As such, in operation the output voltage $V_1$ is substantially equal to the voltage at the output of the first current source 212, the output voltage $V_2$ is substantially equal to the voltage at the output of the second current source 214.

The relevant ratio is the ratio between the respective currents $u_3$ and $u_4$ produced by the corresponding first and second current sources 212 and 214, denoted as $r_u$. That is, $r_u$ is $u_3:u_4$.

Turning to FIG. 4C, with continued reference to FIG. 3, shown is a schematic illustration of a third example of the voltage bias circuit 101c shown with the first switch $S_1$ included in FIG. 3. The voltage bias circuit 101c includes first and second diodes 221 and 223, a current source 222, and a switch $S_c$. The switch $S_c$ is connectable to the current source 222. The switch $S_c$ is also selectively connectable between the respective anodes of the first and second diodes 221 and 223, which are parallel to one another. The first electrical output connection 103 is made at the anode of the first diode 221, and the cathode of the first diode 221 is in turn connected to ground. The second electrical output connection 105 is made at the anode of the second diode 223, and the cathode of the second diode 223 is in turn connected to ground. In operation the output voltage $V_1$ is substantially equal to the voltage at the anode of the first diode 221, and the output voltage $V_2$ is substantially equal to the voltage at the anode of the second diode 223.

The relevant ratio is the ratio between the respective sizes $d_4$ and $d_5$ of the corresponding first and second diodes 221 and 223, denoted as $r_d$. That is, $r_d$ is $d_4:d_5$.

The value of the relevant ratio in each of the examples described above is preferably set so as to simplify digital logic in the digital physical parameter calculator. For example, in some examples, in order to avoid floating point numbers, and thus simplify the design of digital components in other parts of the electronic sensor 100, a ratio that can be easily represented by a binary number may be used. In some examples, the digital components may be further simplified by setting the relevant ratio to a number equal to $2^n$, where n is an integer. For example, in the examples described with reference to FIGS. 6A, 7A and 8, the relevant ratio is chosen to be $16 (=2^4)$. There is nothing particularly special about the number 16, except that it is one possible value that leads to simplifications in the digital components of the electronic sensors in the examples described with reference to FIGS. 6A, 7A and 8.

Moreover, in many examples the aforementioned diodes are preferably parasitic PNP base-emitter diodes available in CMOS manufacturing processes.

Figure 5:
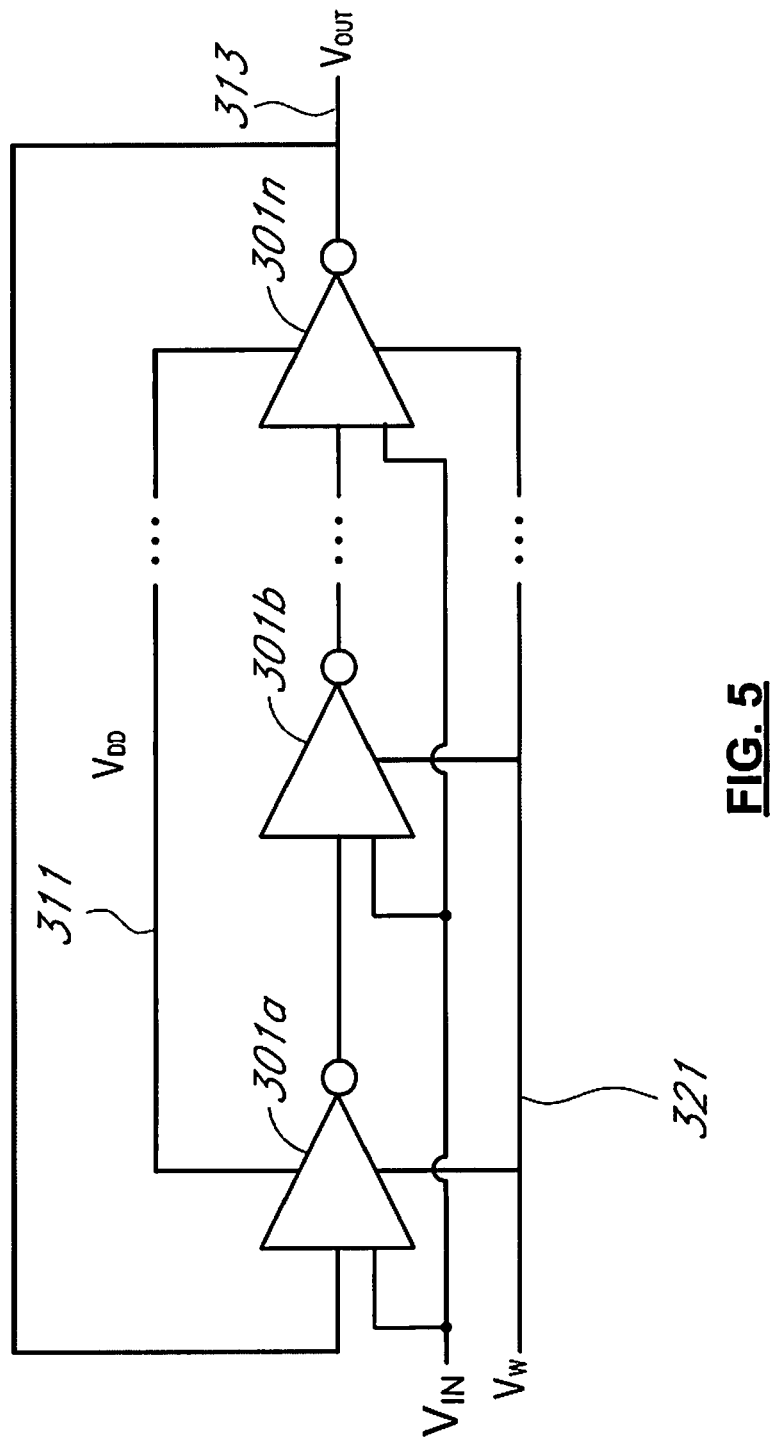
FIG. 5 is a schematic illustration of a ring oscillator adapted to operate as a voltage controlled oscillator (VCO).

FIG. 5 is a schematic illustration of an example of a ring oscillator 300 configured to operate as a VCO. The ring oscillator 300 includes an odd number of inverters 301a, 301b, ..., 301n connected in series. The output of the last inverter 301n is connected to the input of the first inverter 301a. Each inverter 301a, 301b, ..., 301n is coupled to the top rail voltage supply connection $V_{DD}$ of the VCO 111 of FIG. 3. Each inverter 301a, 301b, ..., 301n is also coupled to the voltage input control connection $V_{IN}$, the voltage which is used to control the operating frequency of the ring oscillator 300.

In some examples, the ring oscillator has seven stages, and the input control is provided to two stages. However, those skilled in the art will appreciate from the present disclosure that various configurations for a ring oscillator that can be utilized without departing from the scope of the claims.

With reference to FIGS. 3 and 5, in some examples, the VCO 111 has a substantially linear operating range, meaning that over an input voltage range, the VCO 111 frequency output change is linear as a function of the input control voltage. A first order model of a VCO transfer function can be defined as $f=k_v*[Hz]$, where $k_v$ is the frequency sensitivity of the VCO and $V_{in}$ is the input control voltage. However, second order models for VCO circuits are often more accurate. A second order model for a VCO can be characterized with a transfer function approximated by a quadratic equation: $f=k_{v2}*V_{in}^2+k_v*V_{in}+k_{v0}$ [Hz]. The digital calculations used in some examples can be made more accurate when the $k_{v2}$ and $k_{v0}$ factors are small or approximately as zero.

While a ring oscillator is presented herein, those skilled in the art will appreciate that other VCO circuit designs are available. For example, suitable VCO designs include, but are not limited to multivibrators, and integrate and dump circuits.

Figure 6A:
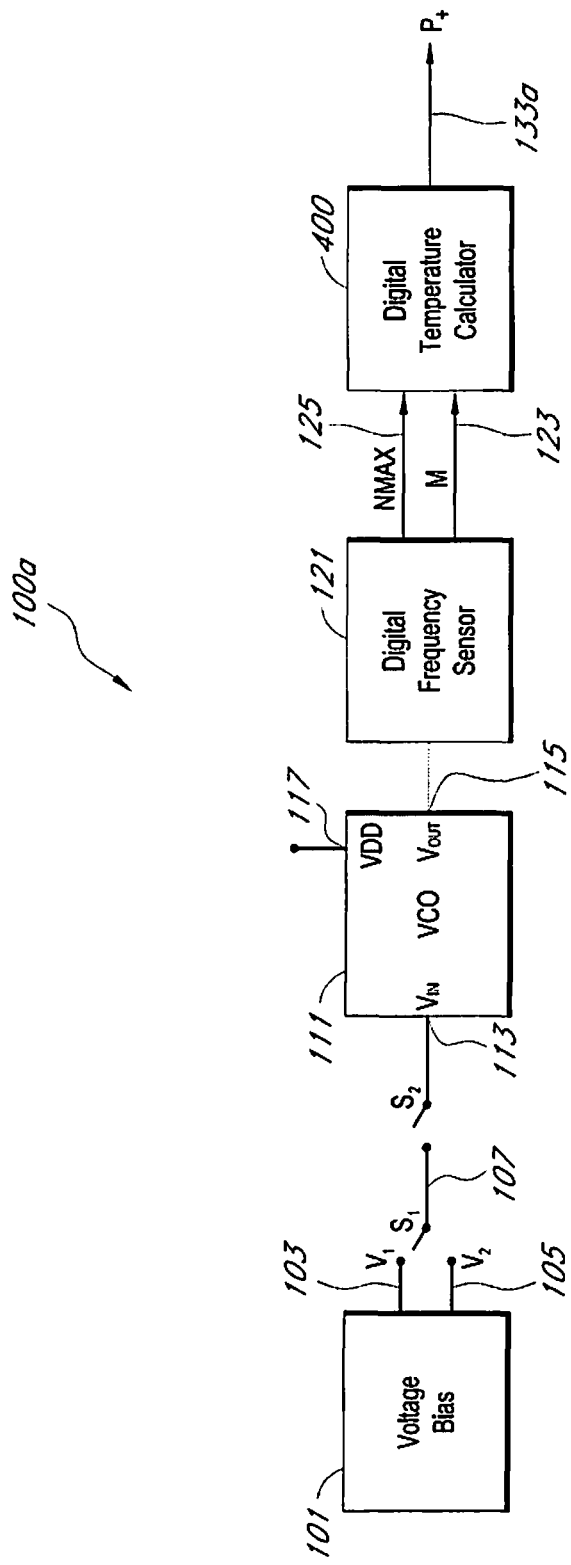
FIG. 6A is a block diagram of an electronic sensor configured to provide a digital value indicative of a temperature measurement.

FIG. 6A is a block diagram of an example of an electronic sensor 100a configured to provide a digital value $P_t$ indicative of a temperature measurement. The electronic sensor 100a illustrated in FIG. 6A is similar to and adapted from the electronic sensor 100 illustrated in FIG. 3. Accordingly, elements common to both electronic sensors 100 and 100a share common reference indicia, and only differences between the electronic sensors 100 and 100a are described herein for the sake of brevity.

The electronic sensor 100a does not include the optional voltage converter 141 or the optional second switch $S_2$ included in FIG. 3. Accordingly, electrical node 107 is directly coupled to the electrical input connection 113 of the VCO 111 in the electronic sensor 100a. Moreover, the digital physical parameter calculator 131 included in the electronic sensor 100 of FIG. 3 has been replaced with a digital temperature calculator 400 in the electronic sensor 100a of FIG.

6A. The digital temperature calculator 400 is connectable to receive digital values NMAX and M from the digital frequency sensor 121.

In operation, the digital temperature calculator 400 receives digital values NMAX and M. Using the digital values NMAX and M, the digital temperature calculator 400 derives the digital value $P_t$, which is indicative of a temperature measurement. In some examples, the digital value $P_1$ is derived by exploiting bandgap theory through the operation of the voltage bias circuit 101 and frequency response of the VCO 111.

As noted above with reference to FIGS. 4A, 4B and 4C, within each of the three examples of the current set voltage bias 101a, 101b, 101c it is preferable that the diodes are parasitic PNP base-emitter diodes. Parasitic PNP-base-emitter diodes are often available in CMOS manufacturing processes. In such examples, the voltage across the base-emitter $V_{be}$ (of a diode) and the variation of that voltage $\Delta V_{be}$ can be approximately inferred from measurements of NMAX and M, so long as the NMAX and M are measured while the VCO 111 is in a substantially linear operating region.

From bandgap theory, $$V_{bg} = V_{be} + K\Delta V_{be} \qquad (2)$$

where $V_{bg}$ is the bandgap voltage.

Bandgap theory also provides that $K\Delta V_{be}$ is approximately proportional to the absolute temperature, and that $K\Delta V_{be}/V_{bg}$ is also approximately proportional to the absolute temperature.

Additionally, NMAX is approximately proportional to $V_{be}$ and M is approximately proportional to $\Delta V_{be}$, so long as the VCO 111 is in a substantially linear operating region when the measurements are taken. In both cases, the proportionality constant is approximately equal to the frequency sensitivity, kv [Hz/V], of the VCO 111.

It follows then that the bandgap voltage is proportional to NMAX+KM. If K=8, the bandgap voltage is proportional to NMAX/8+M.

It also follows that $$\frac{KM}{NMAX + KM} \propto \text{absolute temperature} \qquad (3)$$

with a value of approximately 0.5V+2 mV/C.

In some examples, the value of K can be set to approximately $2^m$ (where m is an integer) by trimming the current from the voltage bias circuit 101. Preferably, K is set to a value of 8 in order to simplify the digital logic in the digital temperature calculator 400. Accordingly, after scaling and compensating for quantization noise equation (3) can be approximated as, $$TempSense = \frac{GAIN \cdot M}{NMAX/8 + M} \qquad (4)$$

The value GAIN is a scaling factor that can be chosen to achieve a desired output word length suitable for convenient binary operations in digital logic. For example, if the value of 2048 is chosen for GAIN, 17-bit digital processing can be employed. Those skilled in the art will appreciate that different word lengths can be chosen so that 32-bit, 64-bit, 128-bit or even custom-specified digital processing can be employed.

Equation (4) remains accurate so long as the frequency sensitivity, $k_v$, of the VCO 111 remains relatively constant and the $k_{v2}$ and $k_{v0}$ factors are small or approximately as zero. Accordingly, the VCO 111 is preferably operated in a substantially linear operating range to ensure that $k_v$ remains relatively constant.

Figure 6B:
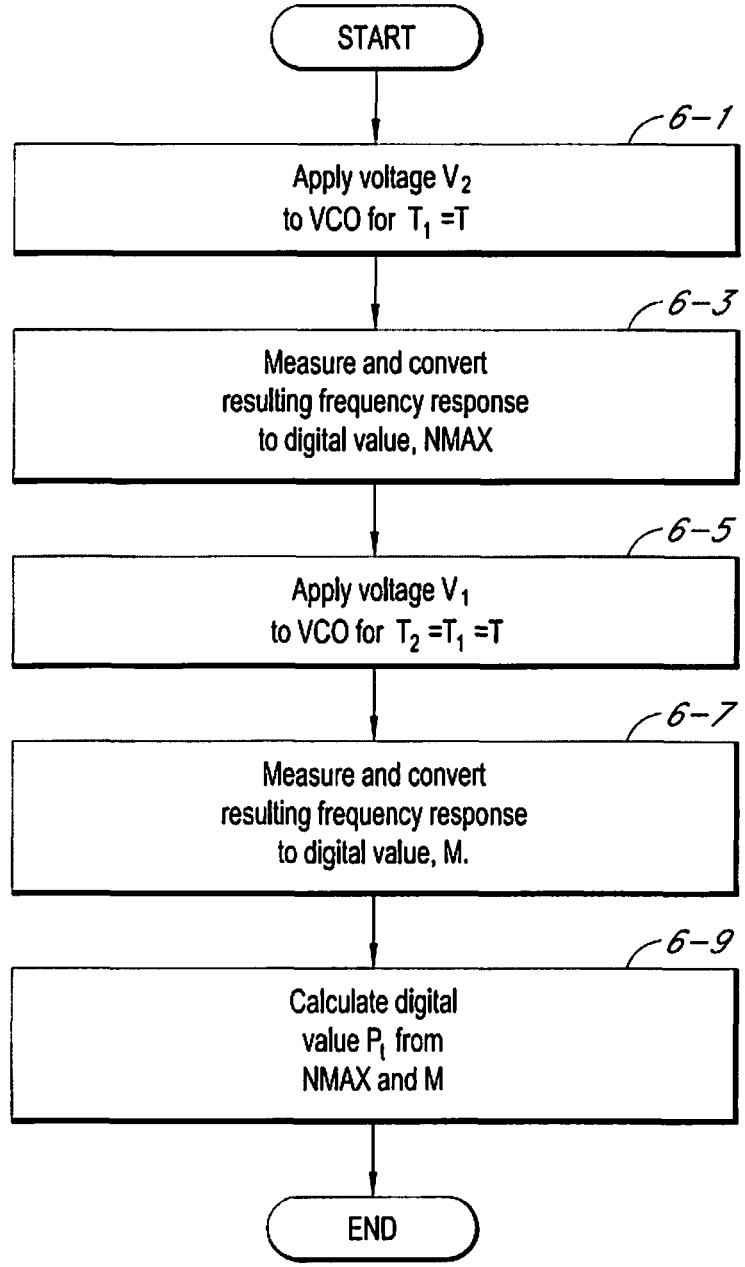
FIG. 6B is a flowchart illustrating one possible method of measuring temperature followed by or using the electronic sensor of FIG. 6A.
Figure 6C:
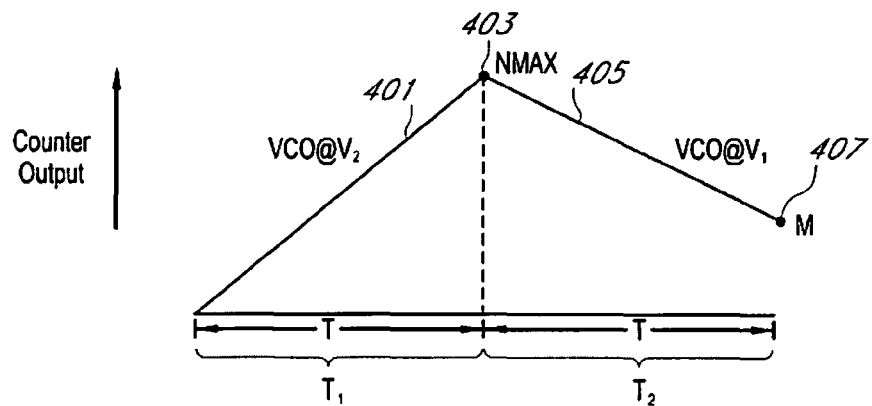
FIG. 6C is an illustration showing an example output response of a VCO included in the electronic sensor of FIG. 6A.

FIG. 6B is a flowchart illustrating one possible method of measuring temperature followed by or using the electronic sensor 100a of FIG. 6A. FIG. 6C is a corresponding illustration showing the output response of the VCO 111 as measured by the digital frequency sensor 121 at various points during the method illustrated by the flowchart of FIG. 6B. Accordingly, the flowchart of FIG. 6B is described herein with reference to the output response illustrated in FIG. 6C and to the block diagram representation of the electronic sensor 100a of FIG. 6A.

Beginning at step 6-1 in FIG. 6B, the method includes applying the voltage $V_2$ to the electrical input connection 113 of the VCO 111 for a first duration $T_1$. With reference to FIG. 6A, the voltage $V_2$ is applied to the VCO 111 by connecting the switch $S_1$ to the connection 105 of the voltage bias circuit 101. The first duration $T_1$ has a time value of T that is chosen so that the value of NMAX is within a range. If the digital frequency sensor 121 is an up/down counter (as it is in this example), NMAX is the value of the output count. In some examples, the approximate range for NMAX is 4000 to 20000. In some examples, the approximate range for NMAX is 8192 to 16383. A graphical representation of the output response caused by $V_2$ is shown in FIG. 6C. At the beginning of the first duration $T_1$ the fundamental frequency of the VCO 111 almost immediately shifts to the $k_v*V_2$ [Hz] and remains relatively constant over the first duration $T_1$. During the first duration $T_1$ the output count 401 of the digital frequency sensor 121 increases almost linearly, until a count value 403 corresponding to NMAX is reached.

At step 6-3 in FIG. 6B the method includes measuring the digital value NMAX reached by the end of $T_1$. The corresponding frequency measurement of the VCO 111 made by the digital frequency sensor 121 is approximately equal to NMAX divided by the first duration $T_1$.

At step 6-5 the method includes applying the voltage $V_1$ to the electrical input connection 113 of the VCO 111 for a second duration $T_2$. With reference to FIG. 6A, the voltage $V_1$ is applied to the VCO 111 by connecting the switch $S_1$ to the connection 103 of the voltage bias circuit 101. In this example, the second duration $T_2$ is approximately equal to the first duration $T_2$ (=7). A graphical representation of the output response caused by $V_1$ is shown in FIG. 6C. At the beginning of the second duration $T_2$ the fundamental frequency of the VCO 111 almost immediately shifts to the $k_v*V_1$ [Hz] and remains relatively constant over the first duration $T_2$. During the second duration $T_2$ the output count 405 of the digital frequency sensor 121 decreases almost linearly, until a count value 407 corresponding to M is reached.

At step 6-7 in FIG. 6B the method includes measuring the digital value M reached by the end of $T_2$. The corresponding frequency measurement of the VCO 111 made by the digital frequency sensor 121 is approximately equal to M divided by the second duration $T_2$.

While the first and second durations $T_1$ and $T_2$ are shown as equal to one another, the first and second durations $T_1$ and $T_2$ do not have to be equal to one another. In some examples, the second duration $T_2$ is a multiple of the first duration $T_1$.

Moreover, it is not necessary to derive the first and second digital values NMAX and M after one another in the order described above. In some examples, M is derived before NMAX.

At step 6-9 in FIG. 6B the method includes calculating the digital value $P_t$ using the digital value NMAX and M. The digital value $P_t$ is indicative of a measurement of the operating temperature of the chip the electronic sensor is situated on. The chip itself may be attached, connected or in close proximity to a device or object that influences the temperature of the chip by transferring heat to the chip. As such, the digital value $P_t$ is also indicative of a temperature measurement of the device or object that the chip is attached, connected or in close proximity to.

Figure 6D:
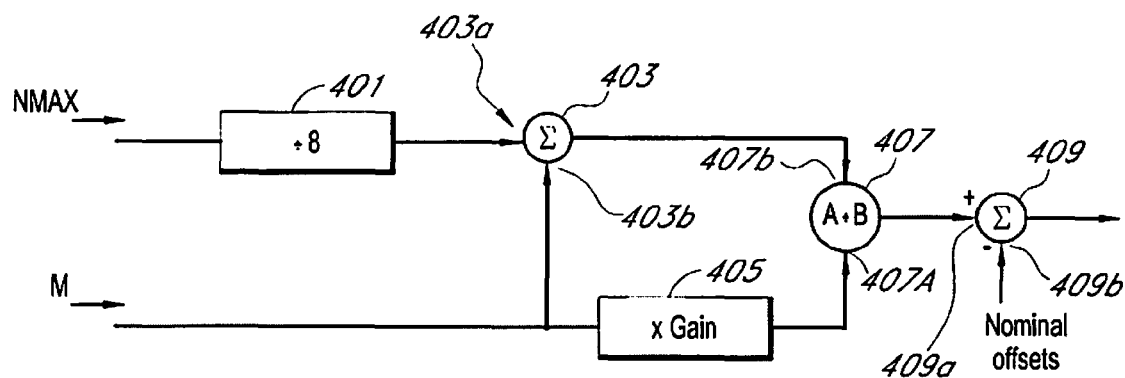
FIG. 6D is a block diagram of a digital temperature calculator circuit included in the electronic sensor of FIG. 6A.

FIG. 6D is a block diagram of one possible example of the digital temperature calculator circuit 400 that may be used to calculate the digital value $P_t$. In this example, the digital temperature calculator circuit 400 includes a digital circuit example of equation (4) above, which can be specified using a hardware description language such as, but not limited to, Verilog and VHDL. An automated design tool can then be used to convert the hardware description language into a digital circuit.

Within the digital temperature calculator circuit 400, the digital circuits corresponding to equation (4) include a first divider 401, an adder 403, a multiplier 405 and a second divider 407. The first divider 401 is connectable to receive NMAX. The divider 401 example is configured to divide NMAX by 8, which is a convenient value for K in equation (3) discussed above. Those skilled in the art would appreciate that the divider 401 can be configured to divide NMAX by any value chosen for K, and that convenient numbers are powers of 2.

The adder 403 includes first and second inputs 403a and 403b. The first input 403a is connectable to receive the output of the first divider 401, and the second input is connectable to receive M. In operation, the adder 403 produces the binary summation of the digital values NMAX/8 and M.

The multiplier 405 is connectable to receive M as an input, and provide GAIN*M as an output.

The second divider 407 includes first and second inputs 407A and 407B. In operation the second divider 407 produces a digital value output equal to the digital value provided at the first input 407A divided by the second input 407B.

The digital temperature calculator circuit 400 also includes a subtracter 409. The subtracter 409 includes first and second inputs 409a and 409b. In operation the subtracter 409 is used to subtract a nominal offset value provided at the second input 409b from the digital value produced by the divider 407 and provided to the first input 409a.

Figure 7A:
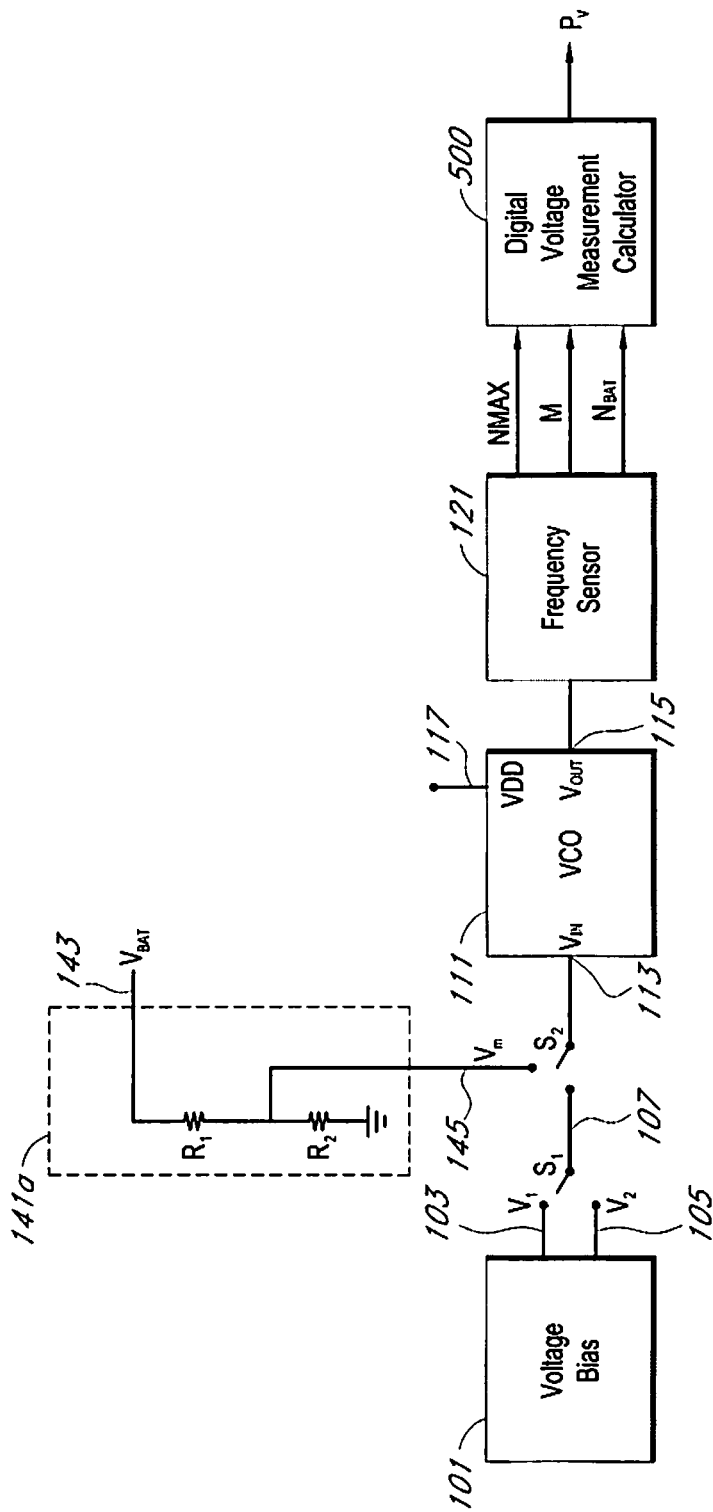
FIG. 7A is a block diagram of an electronic sensor configured to provide a digital value indicative of a voltage measurement.

FIG. 7A is a block diagram of an electronic sensor 100b configured to provide a digital value $P_v$ indicative of a voltage measurement. The electronic sensor 100b illustrated in FIG. 7A is similar to and adapted from the electronic sensor 100a illustrated in FIG. 6A. Accordingly, elements common to both electronic sensors 100a and 100b share common reference indicia, and only differences between the electronic sensors 100a and 100b are described herein for the sake of brevity.

The electronic sensor 100b includes optional voltage converter 141a and the optional second switch $S_2$ included in FIG. 3. Accordingly, the electrical input connection 113 of the VCO 111 is connectable to the switch $S_2$. The second switch $S_2$ is selectively connectable between the electrical node 107 and the connection 145 of the optional voltage converter 141. Again, the electrical node 107 is ultimately connectable to the voltage bias circuit 101 through switch $S_1$.

In the example illustrated in FIG. 7A, the optional voltage converter 141a is effectively a voltage divider. The voltage divider includes first and second resistors $R_1$ and $R_2$ connected in series between the electrical input connection 143 and ground. The electrical output connection 145 is made from the connection between the first and second resistors $R_1$ and $R_2$. In operation, the voltage $V_m$ at the connection 145 is $VBAT/(R_2/R_1+R_2)$, where VBAT is the value of the input voltage applied at connection 143.

Moreover, the digital physical parameter calculator 131 included in the electronic sensor 100 of FIG. 2 has been replaced with a digital voltage measurement calculator 500 in the electronic sensor 100b of FIG. 7A. The digital voltage measurement calculator 500 is connectable to receive digital values NMAX, M and $N_{bat}$ from the digital frequency sensor 121.

The digital value $N_{bat}$ can be related to a measurement of VBAT in an analogous manner to the way in which NMAX and M are related to the absolute temperature. As stated above, $$V_{bg}=V_{be}+8\Delta V_{be}=(NMAX+8M)/k,$$

Since $N_{bat}=k_v*V_m$, we can define digital value BSENSE:

$$BSENSE = 256*V_m/V_{bg} = 256*N_{bat}/(NMAX + 8M) = 32*N_{bat}/(NMAX/8 + M)$$

Since $V_{bg}$ is approximately 1.2 V and $V_m$ is VBAT/5 (because R1 and R2 form a divide by 5 voltage divider circuit), we can calculate VBAT from BSENSE:

$$VBAT=BSENSE*5*1.2/256=BSENSE/42.7$$

As such, VBAT can be determined by equation (5), $$VBAT = \left(\frac{32N_{bat}}{NMAX/8 + M}\right) + 42.7 \tag{5}$$

Figure 7B:
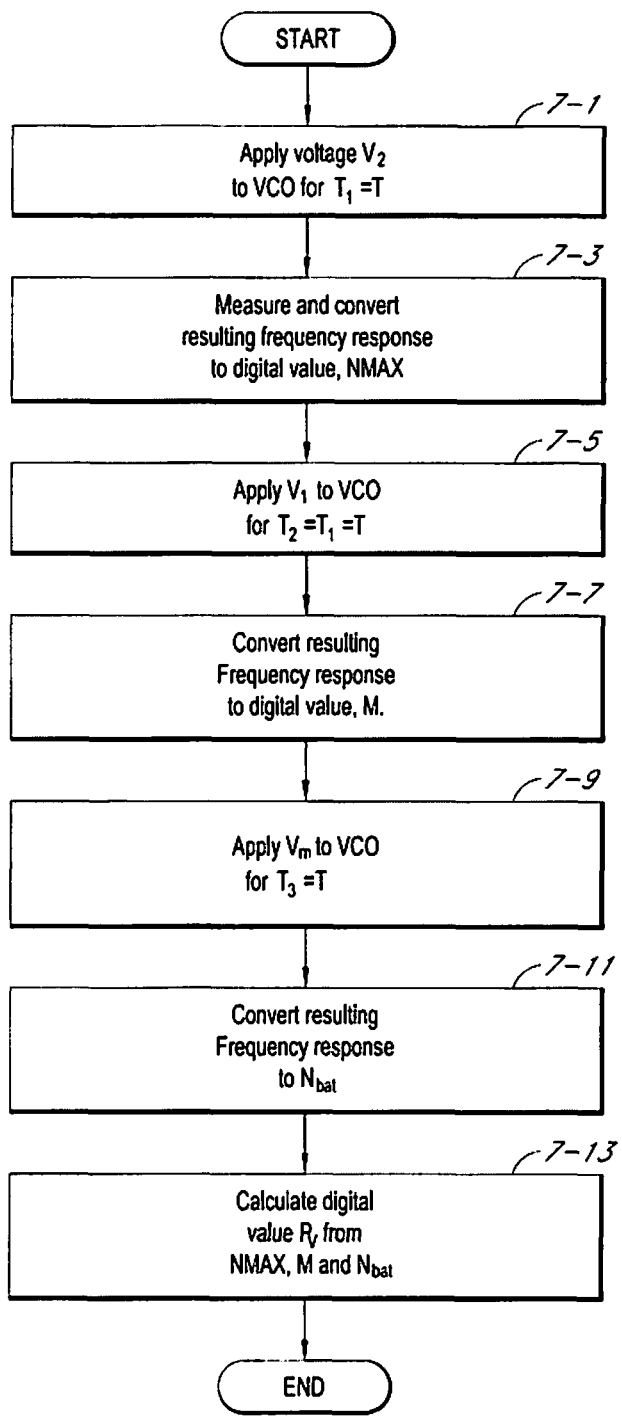
FIG. 7B is a flowchart illustrating one possible method of measuring voltage followed by or using the electronic sensor of FIG. 7A.
Figure 7C:
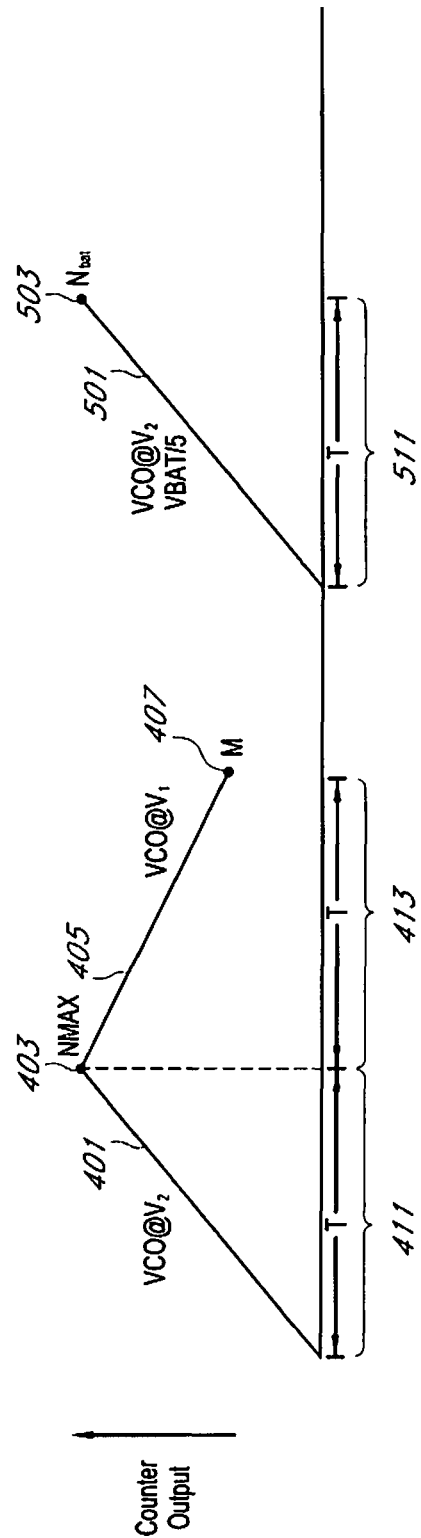
FIG. 7C is an illustration showing an example output response of a VCO included in the electronic sensor of FIG. 7A.

FIG. 7B is a flowchart illustrating one possible method of measuring voltage followed by or using the electronic sensor 100b of FIG. 7A. FIG. 7C is a corresponding illustration showing the output response of the VCO 111 as measured by the digital frequency sensor 121 at various points during the method illustrated by the flowchart of FIG. 7B. Accordingly, the flowchart of FIG. 7B is described herein with reference to the output response illustrated in FIG. 7C and to the block diagram representation of the electronic sensor 100b of FIG. 7A.

Beginning at step 7-1 in FIG. 7B, the method includes applying the voltage $V_2$ to the electrical input connection 113 of the VCO 111 for a first duration $T_1$. With reference to FIG. 7A, the voltage $V_2$ is applied to the VCO 111 by connecting the first switch $S_1$ to the connection 105 of the voltage bias circuit 101 and connecting the second switch $S_2$ to electrical node 107. The first duration $T_1$ has a time value of T that is chosen so that the value of NMAX is within a range. In some examples, the approximate range is 4000 to 20000. In some examples, the approximate range is 8192 to 16383. A graphical representation of the output response caused by $V_2$ is shown in FIG. 7C. At the beginning of the first duration $T_1$ the fundamental frequency of the VCO 111 almost immediately shifts to the $k_v*V_2$ [Hz] and remains relatively constant over the first duration $T_1$. During the first duration $T_1$ the output count 401 of the digital frequency sensor 121 increases almost linearly, until a count value 403 corresponding to NMAX is reached.

At step 7-3 in FIG. 7B the method includes measuring the digital value NMAX reached by the end of $T_1$. The corresponding frequency measurement of the VCO 111 made by the digital frequency sensor 121 is approximately equal to NMAX divided by the first duration $T_1$.

At step 7-5 the method includes applying the voltage $V_1$ to the electrical input connection 113 of the VCO 111 for a second duration $T_2$. With reference to FIG. 7A, the voltage $V_1$ is applied to the VCO 111 by connecting the first switch $S_1$ to the connection 103 of the voltage bias circuit 101 and connecting the second switch $S_2$ to electrical node 107. In this example, the second duration $T_2$ is approximately equal to the first duration $T_2$ (=T). A graphical representation of the frequency response caused by $V_1$ is shown in FIG. 7C. At the beginning of the second duration $T_2$ the fundamental frequency of the VCO 111 almost immediately shifts to the $k_v*V_1$ [Hz] and remains relatively constant over the second duration $T_2$. During the second duration $T_2$ the output count 405 of the digital frequency sensor 121 decreases almost linearly, until a count value 407 corresponding to M is reached.

At step 7-7 in FIG. 7B the method includes measuring the digital value M reached by the end of $T_2$. The corresponding frequency measurement of the VCO 111 made by the digital frequency sensor 121 is approximately equal to M divided by the second duration $T_2$.

At step 7-9 the method includes applying the voltage $V_m$ to the electrical input connection 113 of the VCO 111 for a third duration $T_3$. With reference to FIG. 7A, the voltage $V_m$ is applied to the VCO 111 by connecting the second switch $S_2$ to connection 145. The third duration $T_3$ is approximately equal to the first and second durations, $T_3$ (=$T_1$=$T_2$=T). A graphical representation of the output response caused by $V_m$ is shown in FIG. 7C. At the beginning of the third duration $T_3$ the fundamental frequency of the VCO 111 almost immediately shifts to the $k_v*V_m$ [Hz] and remains relatively constant over the third duration $T_3$. During the third duration $T_2$ the output count 501 of the digital frequency sensor 121 increases almost linearly, until a count value 503 corresponding to $N_{bat}$ is reached.

At step 7-11 in FIG. 7B the method includes measuring the digital value $N_{bat}$ reached by the end of $T_3$. The corresponding frequency measurement of the VCO 111 made by the digital frequency sensor 121 is approximately equal to $N_{bat}$ divided by the third duration $T_3$.

At step 7-13 in FIG. 7B the method includes calculating the digital value $P_v$ using the digital values NMAX, M and $N_{bat}$. The digital value $P_v$ is indicative of a measurement of the voltage VBAT from a voltage source connected to the electrical input connect 143 of the optional voltage converter 141a the electronic sensor 100b is coupled to.

While the first, second and third durations $T_1$, $T_2$, and $T_3$ are shown as equal to one another, the first, second and third durations $T_1$, $T_2$, and $T_3$ do not have to be equal to one another. In some examples, the second duration $T_2$ is a multiple of the first duration $T_1$. In some examples, the third duration $T_3$ is a multiple of the first duration $T_1$. In some examples, the sum of the first, second and third durations $T_1$, $T_2$, and $T_3$ is selected to be short enough to ensure that the physical parameter does not change while a measurement is being made.

Moreover, it is not necessary to derive the first and second digital values NMAX, M and $N_{bat}$ after one another in the order described above. The digital values NMAX, M and $N_{bat}$ can be derived in any order.

Figure 7D:
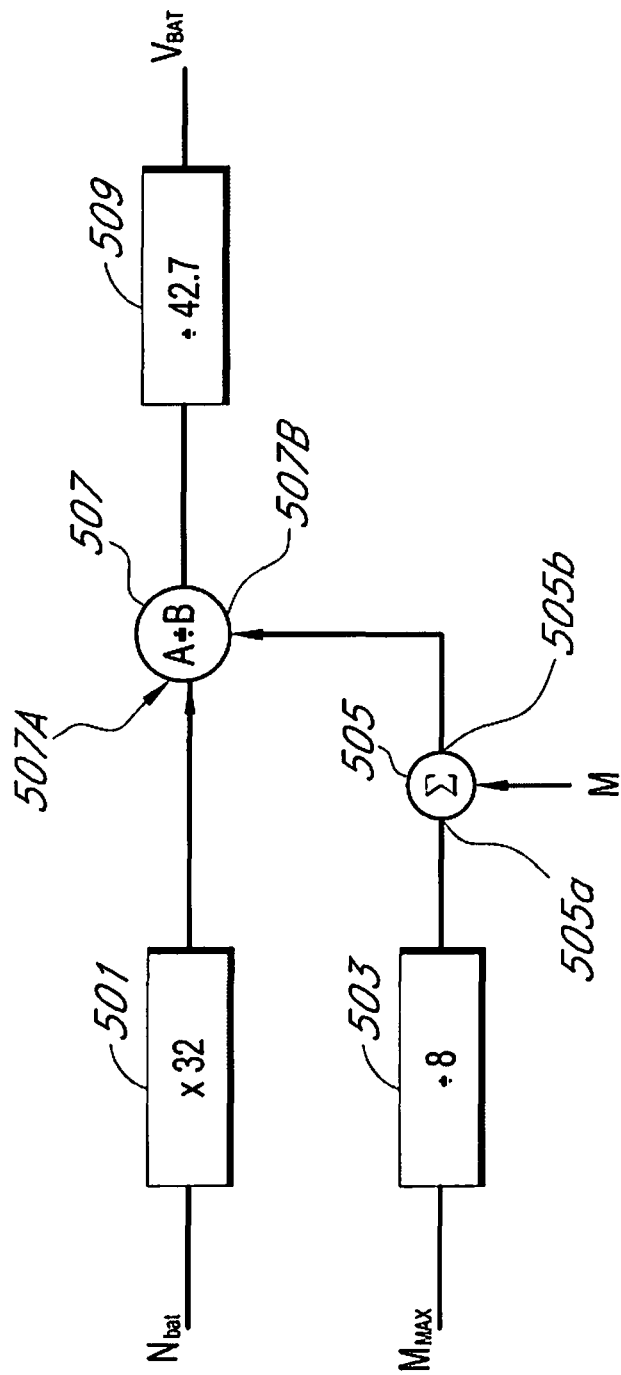
FIG. 7D is a block diagram of a digital voltage measurement calculator circuit included in the electronic sensor of FIG. 7A.

FIG. 7D is a block diagram of one possible example of the digital voltage measurement calculator circuit 500 that may be used to calculate the digital value $P_v$. In this example, the digital voltage measurement calculator circuit 500 includes a digital circuit example of equation (5) above, which can be specified using a hardware description language such as, but not limited to, Verilog and VHDL. An automated design tool can then be used to convert the hardware description language into a digital circuit.

Within the digital voltage measurement calculator circuit 500, the digital circuits corresponding to equation (5) include a multiplier 501, a first divider 503, an adder 505, a second divider 507 and a third divider 509. The multiplier 501 is connectable to receive the digital value $N_{bat}$, and is arranged to multiply $N_{bat}$ by 32 in the digital domain.

The first divider 503 is connectable to receive NMAX. The first divider 503 is configured to divide NMAX by 8, which is a convenient value for K in equation (3) discussed above. Those skilled in the art would appreciate that the first divider 503 can be configured to divide NMAX by any value chosen for K, and that convenient numbers are powers of 2.

The adder 505 includes first and second inputs 505a and 505b. The first input 505a is connectable to receive the output of the first divider 503, and the second input is connectable to receive M. In operation, the adder 403 produces the binary summation of the digital values NMAX/8 and M.

The second divider 507 includes first and second inputs 507A and 507B. In operation the second divider 507 produces a digital value output equal to the digital value provided at the first input 507A divided by the second input 507B.

The third divider 509 is connectable to receive the output of the second divider. The second divider 509 is configured to divide the output of the second divider by 42.7 to produce $P_v$, a measured estimate of VBAT. Alternatively, the third divider 509 can be omitted and $P_v$ can instead be taken as the output of the second divider 507, making $P_v$ a scaled version of an estimate of VBAT.

Figure 8:
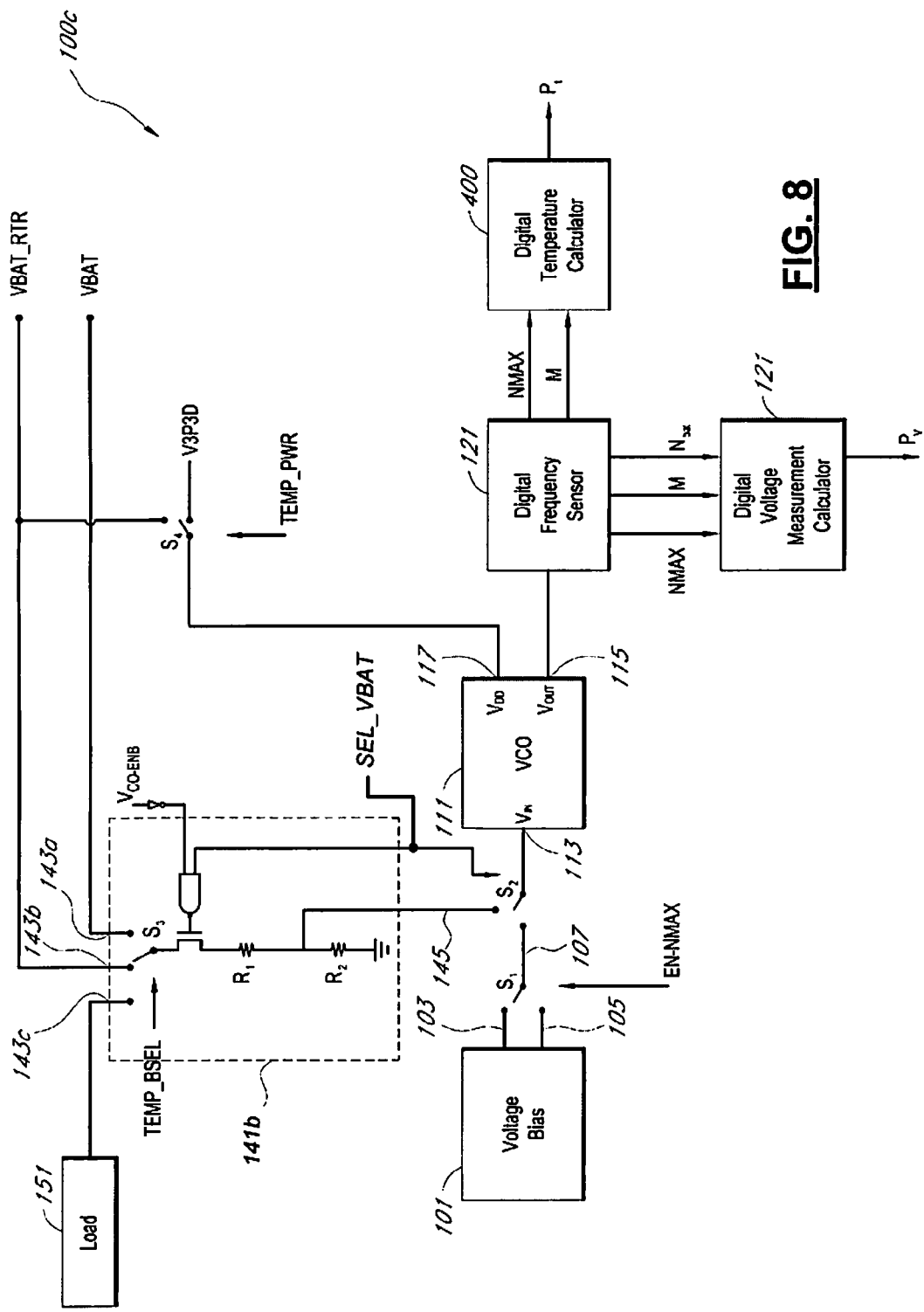
FIG. 8 is a schematic illustration of an electronic sensor system configured to provide digital values indicative of temperature and voltage measurements.

FIG. 8 is a schematic illustration of an example of an electronic sensor system 100c configured to provide the digital values $P_t$ and $P_v$ indicative of respective temperature and voltage measurements. The electronic sensor system 100c is similar to and adapted from the electronic sensors 100a and 100b illustrated in corresponding FIGS. 5A and 6A. Accordingly, elements common to electronic sensors 100a, 100b and 100c share common reference indicia, and only differences between the electronic sensors 100a and 100b and the electronic sensor 100c are described herein for the sake of brevity.

The electronic sensor 100c includes both the digital temperature calculator 400 and the digital voltage measurement calculator 500. Both the digital temperature calculator 400 and the digital voltage measurement calculator 500 are connectable to the frequency sensor 121 as described above with reference to FIGS. 6A and 7A.

The optional voltage converter 141b includes a third switch $S_3$ that can be selectively connected to one of three electrical input connections 143a, 143b, 143c. The three electrical input connections 143a, 143b, 143c are provided as an example only. Those skilled in the art will appreciate that an optional voltage converter can have any number of electrical connections. The third switch $S_3$ is used to select a voltage source to measure, as separate voltage sources can be connected to each of the three electrical input connections 143a, 143b, 143c.

In operation, the digital values $P_t$ and $P_v$ indicative of respective temperature and voltage measurements can be produced in the same manner as described above with reference to FIGS. 6A-6D and 7A-7D. Accordingly, the methods described above will not be repeated here for the sake of brevity.

Also in operation, battery impedance can be measured. One way of determining battery impedance is the measure the load current and VBAT when a load is connected to the battery being measured (i.e. VBAT[load]), and measure VBAT when there is no load (i.e. VBAT[no load]). In turn, the battery impedance is approximately equal to the difference (between VBAT[load] and VBAT[no load]) divided by the load current.

Although the foregoing disclosure has been described in terms of specific examples, other examples will be apparent to those of ordinary skill in the art from the disclosure herein. For example, a skilled artisan will recognize from the disclosure herein that various methods of manufacture, design, and materials can be used to make the various components described herein. For example, a person of ordinary skill in the art would understand that the optional voltage converter can be further adapted to provide an output analog voltage signal proportional to any number of different continuous time varying physical parameters. Additionally, other combinations, omissions, substitutions and modifications will be apparent to the skilled artisan in view of the disclosure herein. It is contemplated that various aspects and features of the disclosure described can be practiced separately, combined together, or substituted for one another, and that a variety of combination and sub-combinations of the features and aspects can be made and still fall within the scope of the disclosure. Furthermore, the systems described above need not include all of the modules and functions described in the examples. Accordingly, the present disclosure is not intended to be limited by the recitation of the specific examples described above, but is to be defined by reference to the appended claims.

Some examples will be relatively less complex, have a relatively lower component count, and dissipate a relatively less power. Some examples, will occupy relatively small die area, will be relatively less difficult to test in production, will be relatively more portable to new digital integrated circuit manufacturing processes, and less sensitive to batch variations common to integrated circuit manufacturing processes.

What is claimed is:

1. An electronic sensor configured to compensate for temperature and measure a physical parameter, the electronic sensor comprising:
a voltage bias circuit having at least one electrical output connection and first and second circuit elements, the first circuit element having a first physical characteristic of a first value and the second circuit element having a second physical characteristic of a second value, wherein the first and second values are set according to a first ratio relating the first value to the second value;
a voltage controlled oscillator connectable to the at least one electrical output connection of the voltage bias circuit;
a frequency sensor connectable to the voltage controlled oscillator, wherein in operation the frequency sensor provides a first digital value and a second digital value, indicative of an operating frequency of the voltage controlled oscillator at two different points in a linear operating region; and
a first digital physical parameter calculator circuit connectable to the frequency sensor to receive the first and second digital values, the first digital physical parameter calculator including digital logic configured to derive at least one digital value indicative of a measured physical parameter using the first and second digital values.

2. The electronic sensor of claim 1, wherein the voltage bias circuit and the voltage controlled oscillator are integrated onto a single semiconductor die.

3. The electronic sensor of claim 1, wherein the first and second circuit elements included in the voltage bias circuit are first and second diodes, and the first and second physical characteristics are respective sizes of the first and second diodes.

4. The electronic sensor of claim 3, wherein the first and second diodes are parasitic PNP base-emitter diodes.

5. The electronic sensor of claim 4, wherein the respective first and second values are corresponding areas of the first and second diodes.

6. The electronic sensor of claim 3, further comprising:
a switch; and
a current source, wherein the switch is connectable to the current source, and the switch is selectively connectable to the first and second diodes.

7. The electronic sensor of claim 6, wherein the at least one electrical output connection of the voltage bias circuit is made between the switch and the current source.

8. The electronic sensor of claim 3, further comprising:
a first current source connectable in series to the first diode; and
a second current source connectable in series to the second diode,
wherein the voltage bias circuit includes first and second electrical output connections, the first output connection made between the first current source and the first diode, the second electrical output connection made between the second current source and the second diode.

9. The electronic sensor of claim 1, wherein the first and second circuit elements included in the voltage bias circuit are first and second current sources, and the first and second values are respective magnitudes of currents produced by the first and second current sources in operation.

10. The electronic sensor of claim 9, further comprising:
a switch; and
a diode, wherein the switch is connectable to the diode, and the switch is selectively connectable to the first and second current sources.

11. The electronic sensor of claim 10, wherein at least one electrical output connection of the voltage bias circuit is made between the switch and diode.

12. The electronic sensor of claim 1, wherein the voltage controlled oscillator is a ring oscillator.

13. The electronic sensor of claim 1, where the frequency sensor is a counter circuit.

14. The electronic sensor of claim 1, wherein the digital logic of the first digital physical parameter calculator circuit is configured to derive a digital value indicative of a temperature using the first and second digital values.

15. The electronic sensor of claim 1, further comprising:
a voltage converter connectable to receive an input signal, the voltage converter having an electrical output connection connectable to the voltage controlled oscillator; and
a switch connectable to the voltage controlled oscillator, the switch selectively connectable to the electrical output connection of the voltage converter and the at least one electrical output connection of the voltage bias circuit,
wherein the digital logic of the first digital physical parameter calculator circuit is configured to derive a digital value indicative of a voltage using the first and second digital values and a third digital value.

16. A method of measuring a physical parameter comprising:
generating a first voltage and a second voltage;
supplying the first voltage to a voltage controlled oscillator;
measuring a first value indicative of a fundamental frequency of the voltage controlled oscillator supplied with the first voltage;
supplying the second voltage to the voltage controlled oscillator;

measuring a second value indicative of the fundamental frequency of the voltage controlled oscillator supplied with second voltage; and calculating a third value indicative of the physical parameter using the first and second values.

17. The method of claim 16, wherein the first and second voltages are generated by driving current through first and second pn-junction diodes.

18. The method of claim 17, wherein the first and second pn-junction diodes are sized in relation to one another according to a ratio.

19. The method of claim 16, wherein the physical parameter is a voltage, the method further comprising:
generating a third voltage;
supplying the third voltage to the voltage controlled oscillator;
measuring a fourth value indicative of the fundamental frequency of the voltage controlled oscillator supplied with the third voltage; and
wherein the third digital value indicative of the physical parameter is derived from the first, second and fourth values.

20. An electronic sensor configured to compensate for temperature and measure a physical parameter, the electronic sensor comprising:
a voltage bias circuit having first and second circuit elements that are sized relative to one another according to a first ratio, wherein in operation the first and second circuit elements aid in establishing corresponding first and second output voltages;
a voltage controlled oscillator connectable to receive the first and second output voltages of the voltage bias circuit;
a frequency sensor connectable to the voltage controlled oscillator, wherein in operation the frequency sensor provides respective first and second measurements indicative of an operating frequency of the voltage controlled oscillator generated by the first and second output voltages; and
a first digital physical parameter calculator circuit connectable to the frequency sensor to receive the first and second measurements, the first digital physical parameter calculator including digital logic configured to derive at least one digital value indicative of a measured physical parameter using the first and second measurements.

21. The electronic sensor of claim 20, wherein the voltage bias circuit and the voltage controlled oscillator are integrated onto a single semiconductor die.

22. The electronic sensor of claim 20, wherein the first and second circuit elements included in the voltage bias circuit are first and second diodes.

23. The electronic sensor of claim 22, further comprising:
a switch; and
a current source, wherein the switch is connectable to the current source, and the switch is selectively connectable to the first and second diodes.

24. The electronic sensor of claim 22, further comprising:
a first current source connectable in series to the first diode; and
a second current source connectable in series to the second diode,
wherein the voltage bias circuit includes first and second electrical output connections, the first electrical output connection made between the first current source and the first diode, the second electrical output connection made between the second current source and the second diode.

25. The electronic sensor of claim 20, wherein the first and second circuit elements included in the voltage bias circuit are first and second current sources.

26. The electronic sensor of claim 25, further comprising:
a switch; and
a diode, wherein the switch is connectable to the diode, and the switch is selectively connectable to the first and second current sources.

27. The electronic sensor of claim 20, wherein the digital logic of the first digital physical parameter calculator circuit is configured to derive a digital value indicative of a temperature using the first and second measurements.

28. The electronic sensor of claim 20, further comprising:
a voltage converter connectable to receive an input signal, the voltage converter having an electrical output connection connectable to the voltage controlled oscillator; and
a switch connectable to the voltage controlled oscillator, the switch selectively connectable to the electrical output connection of the voltage converter and at least one electrical output connection of the voltage bias circuit,
wherein the digital logic of the first digital physical parameter calculator circuit is configured to derive a digital value indicative of a voltage using the first and second measurements and a third measurement.

29. An electronic sensor configured to compensate for temperature comprising:
a voltage bias circuit having first and second circuit elements that are sized relative to one another according to a first ratio, wherein in operation the voltage bias circuit provides first and second output voltages;
a voltage controlled oscillator connectable to receive the first and second output voltages;
a frequency sensor connectable to the voltage controlled oscillator, wherein in operation the frequency sensor provides respective first and second measurements indicative of an operating frequency; and
a first digital physical parameter calculator circuit connectable to the frequency sensor to receive the first and second measurements, wherein in operation the digital physical parameter calculator derives at least one digital value indicative of a measured physical parameter using the first and second measurements.

30. The electronic sensor of claim 29, wherein the voltage bias circuit and the voltage controlled oscillator are integrated onto a single semiconductor die.

31. The electronic sensor of claim 29, wherein the first and second circuit elements included in the voltage bias circuit are first and second diodes.

32. The electronic sensor of claim 31, further comprising:
a switch; and
a current source, wherein the switch is connectable to the current source, and the switch is selectively connectable to the first and second diodes.

33. The electronic sensor of claim 31, further comprising:
a first current source connectable in series to the first diode; and
a second current source connectable in series to the second diode,
wherein the voltage bias circuit includes first and second electrical output connections, the first electrical output connection made between the first current source and the first diode, the second electrical output connection made between the second current source and the second diode.

34. The electronic sensor of claim 29, wherein the first and second circuit elements included in the voltage bias circuit are first and second current sources.

35. The electronic sensor of claim 34, further comprising:
a switch; and
a diode, wherein the switch is connectable to the diode, and the switch is selectively connectable to the first and second current sources.

36. The electronic sensor of claim 29, wherein a digital logic of the first digital physical parameter calculator circuit is configured to derive a digital value indicative of a temperature using the first and second measurements.

37. The electronic sensor of claim 29, further comprising:
a voltage converter connectable to receive an input signal, the voltage converter having an electrical output connection connectable to the voltage controlled oscillator; and
a switch connectable to the voltage controlled oscillator, the switch selectively connectable to the electrical output connection of the voltage converter and at least one electrical output connection of the voltage bias circuit,
wherein a digital logic of the first digital physical parameter calculator circuit is configured to derive a digital value indicative of voltage using the first and second measurements and a third measurement.

* * * * *

UNITED STATES PATENT AND TRADEMARK OFFICE
CERTIFICATE OF CORRECTION

PATENT NO. : 8,543,347 B2
APPLICATION NO. : 12/826272
DATED : September 24, 2013
INVENTOR(S) : Bert White Page 1 of 1

It is certified that error appears in the above-identified patent and that said Letters Patent is hereby corrected as shown below:

In the Specifications:

| | |
|---|---|
| Column 3, Line 29 | Delete "51" and insert --53-- |
| Column 4, Line 37 | Delete "144" and insert --145-- |
| Column 6, Line 32 | After "variations", insert --,-- |
| Column 7, Line 29 | After "cathode", delete "215" |
| Column 8, Line 39 | Delete "$f=k_v*[Hz]$" and insert --$f=k_v*V_{in}$ [Hz]-- |
| Column 8, Line 46 | After "approximately", delete "as" |
| Column 9, Line 8 | Delete "$P_1$" and insert --$P_t$-- |
| Column 10, Line 45 | Delete "duration $T_2$ (=7)." and insert --duration, $T_2$ (=$T_1$=T).-- |
| Column 12, Line 15 | Delete "$V_{bg}=V_{be}+8\Delta V_{be}=(NMAX+8M)/k,$" and |
| | insert --$V_{bg}=V_{be}+8\Delta V_{be}=(NMAX+8M)/k_v$-- |
| Column 12, Lines 32-33 | |
| (Equation 5) | Delete "$VBAT=\left(\frac{32N_{bat}}{NMAX/8+M}\right)+42.7$" and |
| | insert --$VBAT=\left(\frac{32N_{bat}}{NMAX/8+M}\right)/42.7$-- |
| Column 13, Line 8 | Delete "duration $T_2$ (=7)." and insert --duration, $T_2$ (=$T_1$=T).-- |
| Column 13, Line 32 | Delete "$T_2$" and insert --$T_3$-- |
| Column 14, Line 64 | Delete "the" and insert --to-- |

Signed and Sealed this
Eighteenth Day of February, 2014

Michelle K. Lee
*Deputy Director of the United States Patent and Trademark Office*